United States Patent [19]
Longas et al.

[11] Patent Number: 5,349,355
[45] Date of Patent: Sep. 20, 1994

[54] CREDENTIAL TRACKING SYSTEM

[75] Inventors: Socrates A. Longas, Glendale; Robert A. Leverance, College Park, both of Md.

[73] Assignee: The United States of America as represented by the Secretary of the Navy, Washington, D.C.

[21] Appl. No.: 16,384

[22] Filed: Jan. 21, 1993

[51] Int. Cl.$^5$ ............................................. G01S 13/80
[52] U.S. Cl. ...................................... 342/42; 342/44; 342/45
[58] Field of Search ................. 342/42, 43, 44, 45, 342/50, 60

[56] References Cited

U.S. PATENT DOCUMENTS

| | | | |
|---|---|---|---|
| 3,714,649 | 1/1973 | Brouwer et al. | 342/44 |
| 3,754,250 | 8/1973 | Bruner | 342/47 |
| 4,633,251 | 12/1986 | McGeoch et al. | 342/44 |
| 5,068,654 | 11/1991 | Husher | 340/903 |
| 5,093,663 | 3/1992 | Baechtiger et al. | 342/60 |
| 5,101,208 | 3/1992 | Parker et al. | 342/45 |
| 5,124,699 | 6/1992 | Tervoert et al. | 342/44 X |
| 5,126,746 | 6/1992 | Gritton | 342/125 |
| 5,144,312 | 9/1992 | McCann | 342/42 |
| 5,144,313 | 9/1992 | Kirknes | 342/44 |
| 5,164,985 | 11/1992 | Nysen et al. | 342/44 X |
| 5,173,705 | 12/1992 | Camiade et al. | 342/42 |
| 5,202,783 | 4/1993 | Holland et al. | 342/45 X |
| 5,216,429 | 6/1993 | Nakagawa et al. | 342/450 |
| 5,231,400 | 7/1993 | Mouldin et al. | 342/45 |
| 5,264,854 | 11/1993 | Spiess | 342/44 |
| 5,278,563 | 1/1994 | Spiess | 342/44 |
| 5,294,931 | 3/1994 | Meier | 342/44 |

*Primary Examiner*—John B. Sotomayor
*Attorney, Agent, or Firm*—Jacob Shuster

[57] ABSTRACT

A microwave carrier signal emitted from a tracker unit is amplitude modulated periodically at different preset modulation frequencies during spaced intervals between established time slots. The carrier signal is detected by differently coded credential units within a reception zone whereby such signal is demodulated at the different modulating frequencies to produce reply signals at one of several different code frequencies during one of the time slots dependent on the credential unit coding. The reply signals are detected by the tracker unit during narrowed reception windows within the time slots. Such reply signals are decoded within separate frequency channels corresponding to the code frequencies thereof to extract signal data processed to indicate entry, departure and status of the credential units relative to the reception zone.

20 Claims, 11 Drawing Sheets

CREDENTIAL TRACKING SYSTEM

BACKGROUND OF THE INVENTION

This invention relates in general to a credential identification system.

Heretofore, systems involving the use of cards having magnetic and/or optical reading properties were inserted into or placed in operative relation to a receiver. Card reading operations were rather slow in such systems and other procedural limitations of a physical nature were often associated therewith. Also, the number of available identification codes associated with credential identification cards in prior systems was rather limited.

Use of such identification systems for certain installations imposes especially burdensome demands, including tracking movement of personnel and equipment as well as operational reliability.

It is therefore an important object of the present invention to provide a credential card type of security system having a relatively large number of available identification codes and the capability of tracking personnel without physical limitations on movement or excessive procedural demands on personnel.

A further object is to provide a security identification system providing the foregoing attritubes in such a manner as to be compatible with computer intelligence and inventory management.

SUMMARY OF THE INVENTIONS

In accordance with the present invention, a solid state electronic tracker unit continuously emits an amplitude modulated microwave search beam covering an effective detection zone of predetermined volume within which a credential card type of responder identification process is performed. The search beam is sequentially modulated at 16 different tracker frequencies during spaced transmit periods of time. Within each transmit period, 64 time slot intervals are established for responder reply by credential signal at one of 8 different available code modulation frequencies during two repeated interrogation cycles of tracker transmission.

Reply signals from one or more credential card units within the detection zone are received by the tracker unit and split into 8 frequency channels corresponding to the modulation code frequencies of the credential units for simultaneous signal processing. Detection of such code modulated reply signals is limited to reception time windows within the 64 time slot intervals designed to accommodate mismatch between tracker and credential unit clocks. Timing for both the reception time windows and the tracker transmit periods are synchronized by generation of signal waveforms through a common crystal oscillator of the tracker carrier signal modulator.

The modulated carrier signal in the tracker search beam is detected by the respective credential units within the detection zone and demodulated therein for evaluation by measurement against one of 16 coded bandwidths corresponding to the 16 tracker modulation frequencies under which the search beam carrier signal is sequentially modulated. Signal adequency is measured within each credential unit also having timing circuits to synchronize emission of a reply signal at one of 8 coded modulation frequencies during one of the 64 code selected time slots.

Operation of the tracker unit is programmed by a controller which selects one of the modulation frequencies of the search beam carrier signal, monitors reception of the reply signals and processes the modulation signal data for readout display of credential identification and status based on modulation frequencies and time slot coding. Credential status is determined in terms of entry into and departure from the detection zone corresponding to rise and fall of reply signal amplitude.

Credential coding being based on 16 tracker modulation frequencies, 8 modulation frequencies for the reply signal and 64 time slots during emission of the reply signal, provides 8192 codes capable of being tracked within a very short period of time, during a ¼ second interrogation cycle. Such operational attributes of the system are made possible by a signal timing program which includes: (a) continuous emission of the search beam, (b) periodic modulation during 64 time slot intervals, (c) triggering credential responses by emission of reply signals at 8 different code modulation frequencies simultaneously detected and processed in separate channels within the tracker unit and (d) limiting detection of the reply signals at the tracker unit to narrow time windows centered within the 64 time slots to accommodate and avoid cummulative errors, caused by mismatch between tracker and credential clocks, by detection of approaching ends of the tracker signal modulation periods.

BRIEF DESCRIPTION OF DRAWING FIGURES

The foregoing objects, other objects, novel features and advantages of the present invention will be more apparent from the following more particular description of the preferred embodiment as illustrated in the accompanying drawings, in which.

DETAILED DESCRIPTION OF PREFERRED EMBODIMENT

Figure 1:
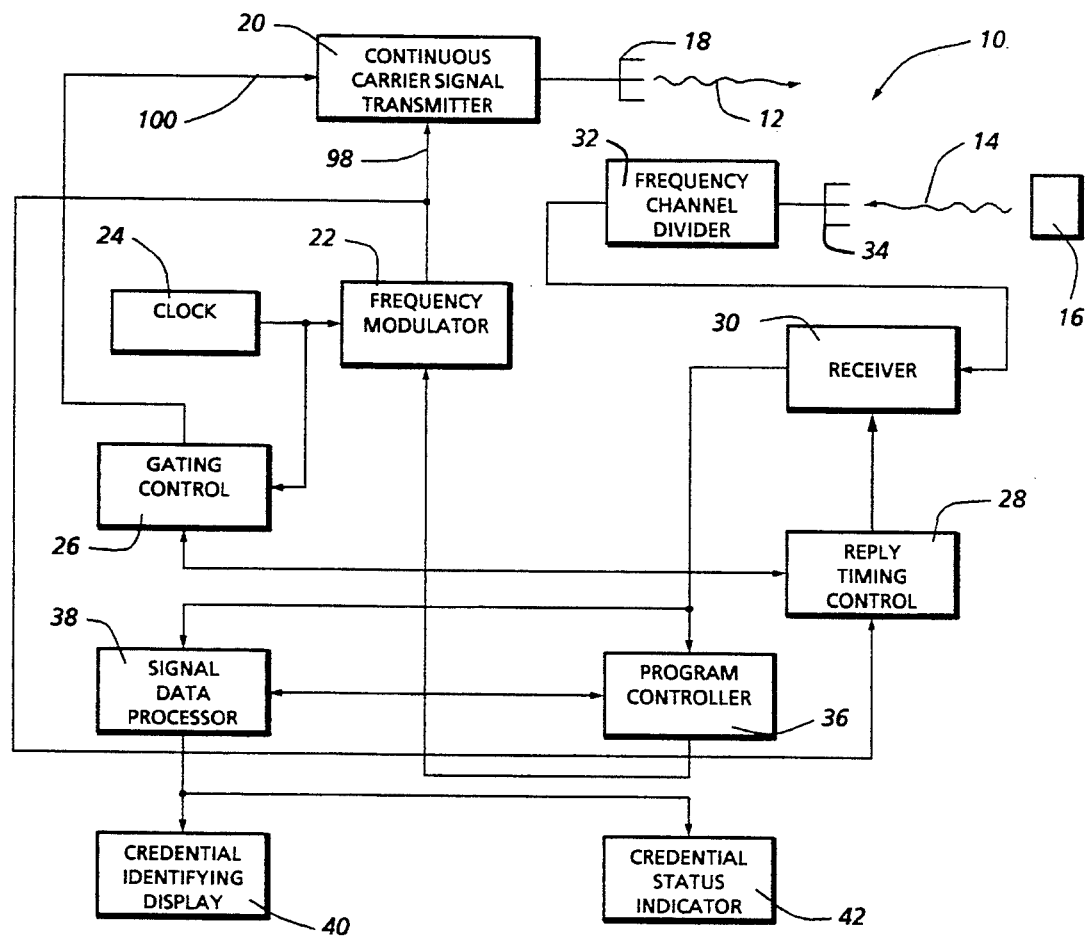
FIG. 1 is a block diagram of the tracker unit associated with the credential identification system of the present invention.

Referring now to the drawing in detail, the block diagram of FIG. 1 schematically depicts a tracker unit 10 at a tracking location. Interrogating radiation in the form of a microwave beam 12 is emitted from the tracker unit 10 to establish in spaced relation thereto a reception zone of predetermined volumetric extent within which credential units 16 are to be tracked and identified at the tracking location. Toward that end, reply signal radiation 14 as schematically depicted in FIG. 1 is received from one or more credential units 16 located within the reception zone being serviced by the tracker unit 10.

Figure 2:
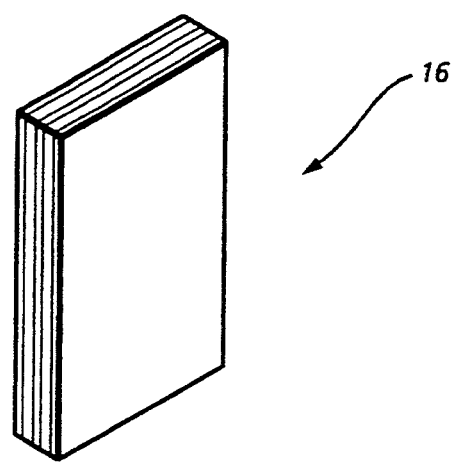
FIG. 2 is a perspective view of a typical identification card type of credential unit associated with the system of the present invention, constructed in accordance with one embodiment thereof.
Figure 11:
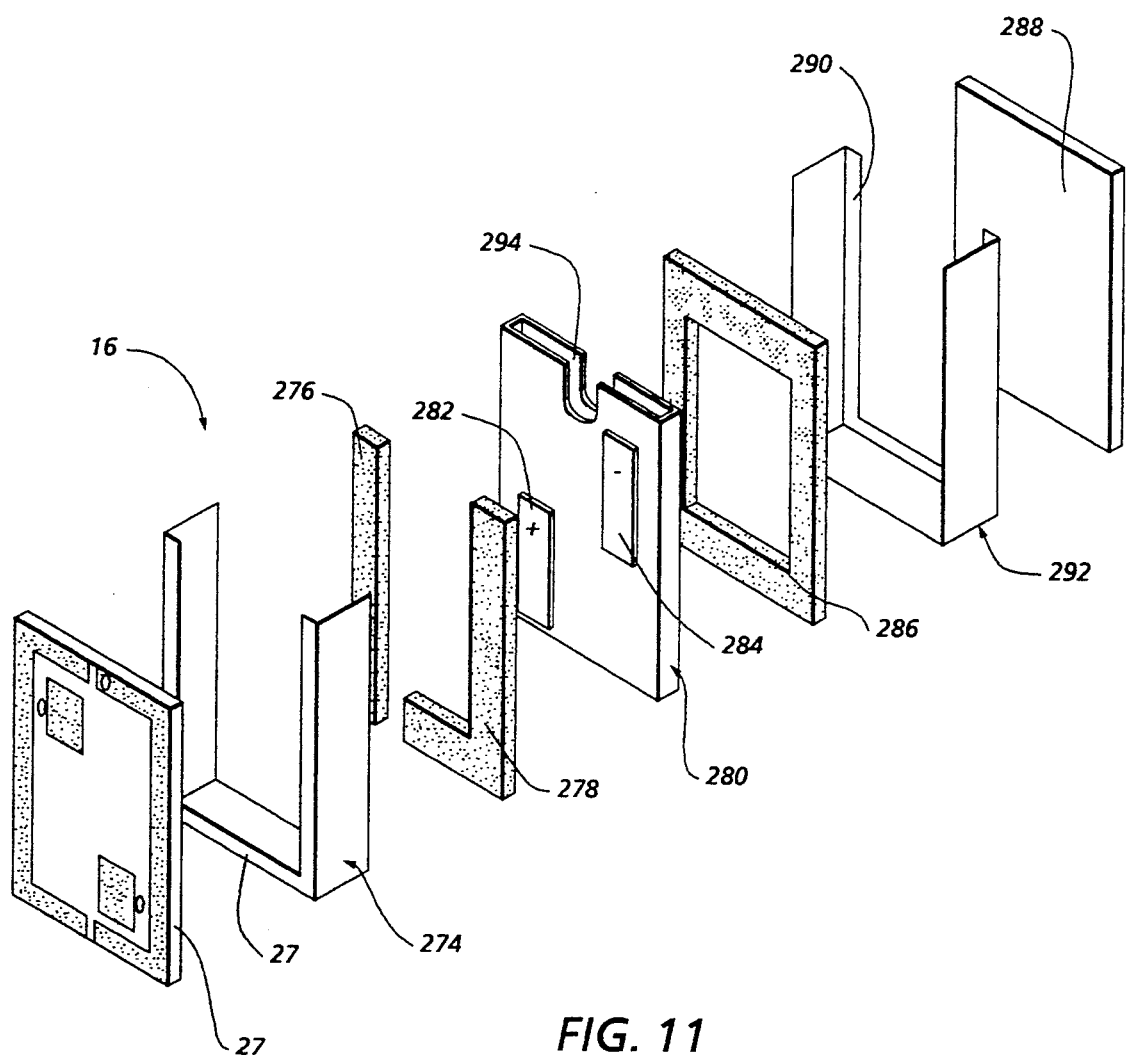
FIG. 11 is a perspective view of disassembled portions of the credential unit illustrated in FIG. 2.

Each of the credential units 16 as shown in FIGS. 2 and 11 may be made in the form of an identification card of multi-laminate construction embodying its own portable source of power, such as a lithium battery. Such credential card units are internally coded with identification data and may be carried by security cleared personnel.

With continued reference to FIG. 1, the interrogating radiation beam 12 is continuously emitted by antenna 18 from a carrier signal transmitter 20. The continuous carrier beam 12 is amplitude modulated during time spaced transmit intervals at 16 different sequential modulation frequencies by means of a frequency modulator 22. Timing of the sequence of modulation frequencies controlling operation of modulator 22 and the timing of the transmit intervals during frequency modulation is dictated by gating of the transmitter 20 through control gate 26, controlled in common with the modulator 22 by a tracker clock 24. Operation of gating control 26 is also coordinated with reception of the reply signals in beam 14 from a credential unit 16 in the credential reception zone, by means of a reply timing control 28 to which a reply signal receiver 30 is connected. The reply signals are fed to receiver 30 through 8 separate frequency channels into which the signal beam 14 is split by frequency channel divider 32, to which a receiving antenna 34 is connected as diagrammed in FIG. 1.

The output of reply signal receiver 30 is fed to a program controller 36 through which operation of the modulator 22 and reply timing control 28 are programmed in accordance with the present invention as also diagrammed in FIG. 1. The program controller 36 is interfaced with a signal data processor 38 to which the output of receiver 30 is also fed in order to extract data from the reply signals in the form of credential identification exhibited by a display 40, and to exhibit credential status through an indicator 42.

Figure 3:
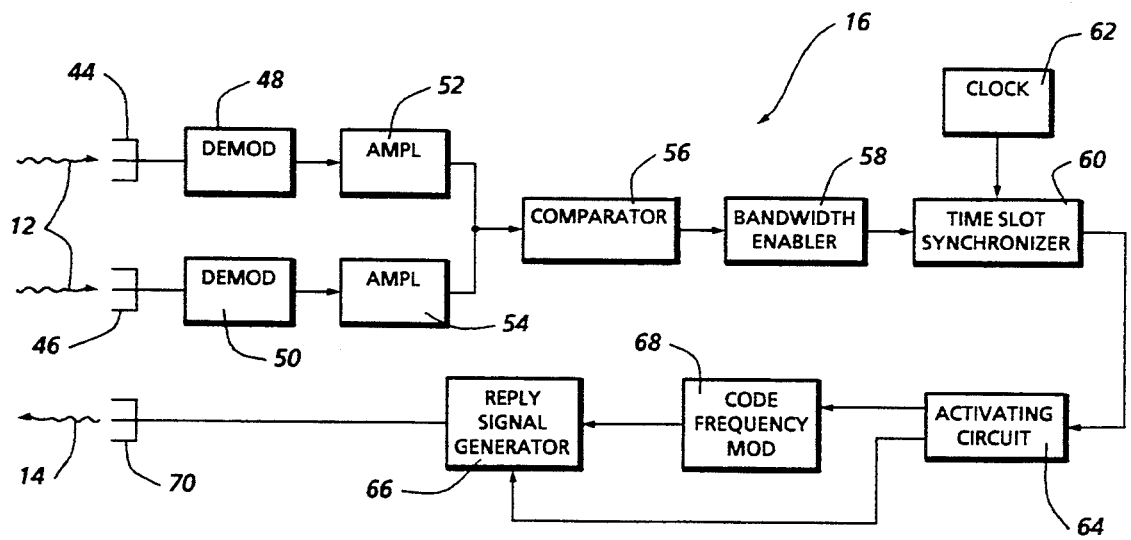
FIG. 3 is a block diagram of the electronic make-up of the credential card unit illustrated in FIG. 2.

As schematically depicted in FIG. 3, the modulated interrogating radiation in beam 12 emitted from tracker unit 10 is picked up by a credential unit 16 in the reception zone through a pair of receiving antennas 44 and 46, such antennas being orientated in perpendicular relationship to each other. The interrogating signal is detected by demodulators 48 and 50, respectively, connected to the receiving antennas 44 and 46 to extract the carrier modulation signals which are amplified by amplifiers 52 and 54 and fed to a comparator 56 for evaluation as to signal adequacy. Such evaluated carrier modulation signals are then fed to a bandwidth enabler 58 within which the 16 modulation frequencies are measured against a preselected bandwidth setting based on the internal coding peculiar to each of the credential units. If one of the 16 modulation frequencies of the transmitted modulation signal is within the internally coded bandwidth to which enabler 58 is set, a time slot synchronizer 60 under control of a unit clock 62 is enabled to establish through activating circuit 64 a reply period between successive modulation intervals of the received interrogation signal during which reply signal generator 66 is operated. Each reply period between successive modulation intervals is divided into 64 different time slots, one of which is selected in accordance with the internal coding of the credential unit 16 by its synchronizer 60 to control the activating circuit 64 which also activates a code frequency modulator 68 to modulate the output of reply signal generator 66 at one of 8 different modulation frequencies also dependent on the internal coding of the credential unit 16. Accordingly, the 16 sequential modulation frequencies of the interrogating carrier signal in beam 12 picked up by each credential unit 16, the 64 time slots between modulation intervals during which the reply signal in beam 14 is emitted by signal generator 66 through antenna 70, and the 8 different modulation frequencies for such reply signals makes available a relatively large number of different internal codes ($16 \times 64 \times 8 = 8192$) for unique identification of a relatively large number of credential units in accordance with the foregoing described embodiment of the invention.

Figure 4:
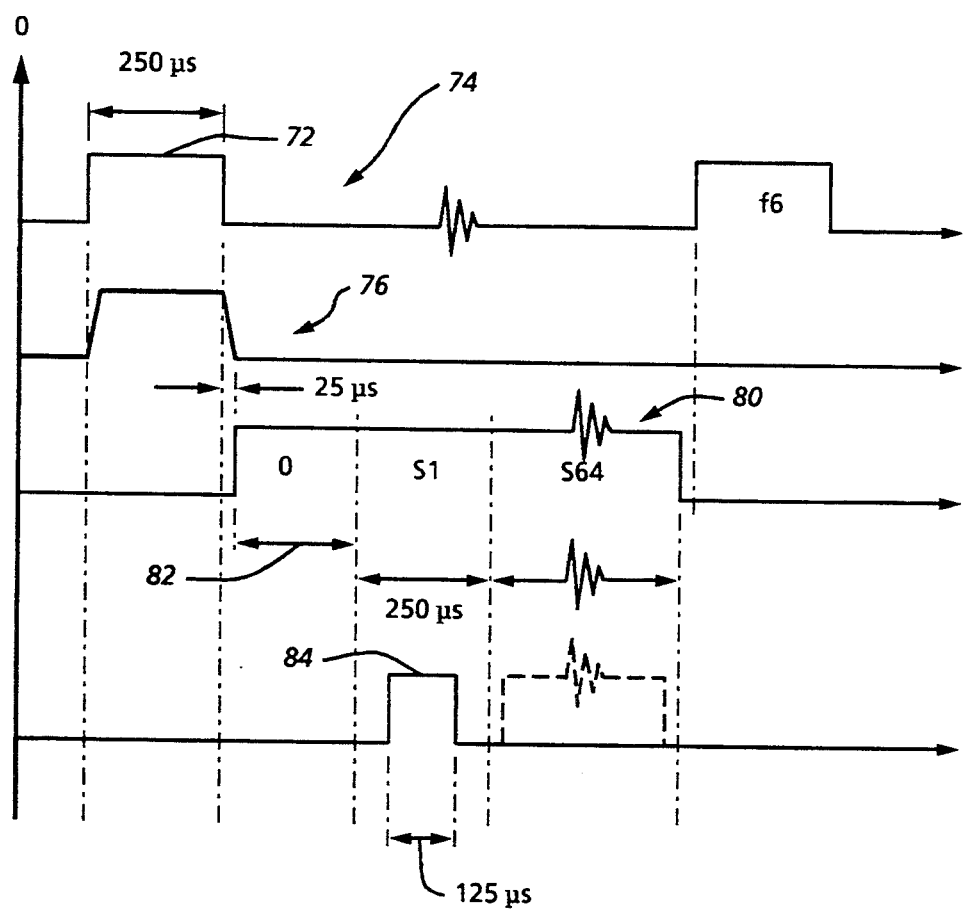
FIG. 4 is a timing diagram associated with the interrogation signal beam from the tracker unit depicted in FIG. 1.

Referring now to the timing diagram of FIG. 4, reference numeral 72 refers to one of the sequential modulation intervals of 250 $\mu s$ duration associated with the output 74 of the tracker transmitter 20 at one of 16 different modulation frequencies $f_1$–$f_{16}$. Reference numeral 78 signifies an enablement portion of a credential interrogation signal 76 of beam 12, in alignment with the modulation interval 72 at one of the coded modulation frequencies ($f_1$) as depicted in FIG. 4. The available reply period between modulation intervals denoted by reference numeral 80 in FIG. 4, begins after a delay of 25 $\mu s$ during which the period of the enablement signal portion falls. An additional delay period 82 as depicted in FIG. 4 is established by synchronizer 60 of the credential unit before the 64 time slots $S_1 \ldots S_{64}$ of 250 $\mu s$ duration are established in order to accommodate mismatch between the credential clock 62 and the clock 24 of the tracker unit 10 as aforementioned in connection with FIGS. 1 and 3. Thus, under control of the reply timing control component 28 of the tracker unit 10, reception of the reply signal by its receiver 30 is limited to a narrowed time window 84, as diagrammed in FIG. 4, within each of the 64 time slots. Such window 84 has a duration of 125 $\mu s$ in the illustrated embodiment. The windows 84 are furthermore centered within corresponding time slots $S_1$–$S_{64}$, as shown in FIG. 4, to avoid any excessive error accumulation as a result of clock timing mismatch. Toward that end, the duration of delay period 82 as shown in FIG. 4 is adjusted by programming of the reply timing control 28 of the trackerr unit through its program controller 36 in accordance with detected mismatch.

Figure 5:
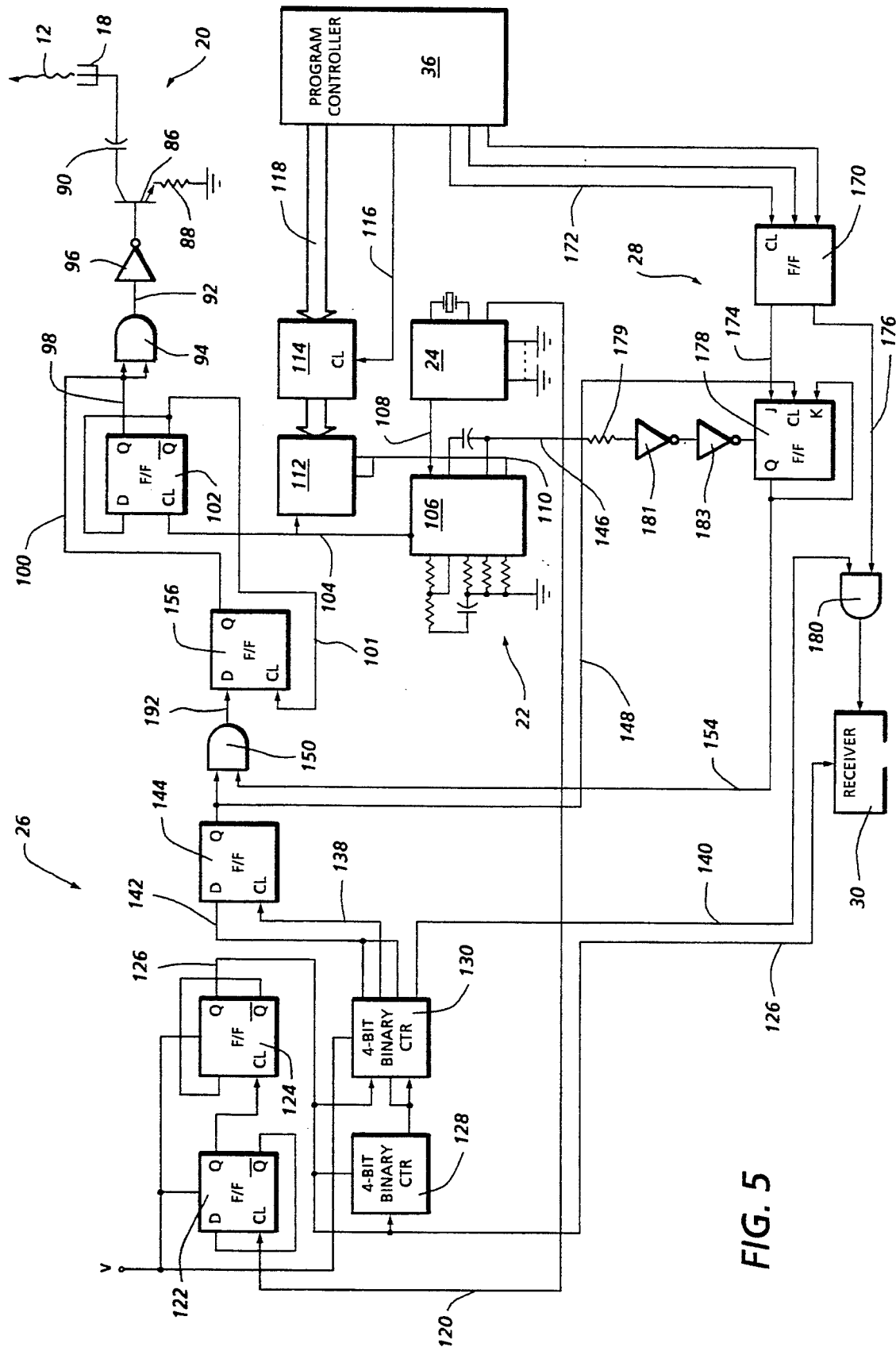
FIG. 5 is a more detailed circuit diagram of portions of the tracker unit depicted in FIG. 1.

Referring now to FIG. 5, the transmitter 20 of tracker unit 10 in the illustrated embodiment consists of an oscillator circuit formed by a transistor 86 having an emitter grounded through resistor 88 and an output collector coupled by capacitor 90 to the transmitting antenna 18. Continuous oscillation of the transmitter circuit 20 at a microwave carrier frequency of 10.46 GHz is maintained by a control voltage on the base of transistor 86 held by NAND gate 94 coupled by inverter 96 to the transistor base. A frequency modulation waveform at the output of NAND gate 94 is established by a frequency modulating signal, applied to one input of the NAND gate 94 by the modulator 22 through line 98 for the modulation interval of 250 μs, aforementioned in connection with FIG. 4, under control of a gating signal applied to the other input of NAND gate 94 through line 100 from the gating control 26.

The modulator 22 as illustrated in FIG. 5 has a dual D-type flip-flop 102, the Q output of which is connected by said line 98 to one input of NAND gate 94 to supply the sequence of 16 frequency modulating signals thereto. The Q output in line 101 connected to the D input of the flip-flop 102 supplies a control signal to the clock input gating control 26. The frequency modulating signals so supplied to NAND gate 94 are stabilized by a signal applied to the clock input 104 of the flip-flop 102 at a frequency of twice the desired modulation frequency by means of a voltage-controlled oscillator of a phase locked loop circuit component 106 which locks onto a 2 KHz clock signal applied to input line 108 of component 106 by the crystal operated clock 24 of the tracker unit. The oscillator of loop 106 is controlled by a rectified input in line 110 from an 8-stage presettable counter 112. The output of counter 112 connected to the clock input line 104, is applied to both the clock input of flip-flop 102 and to the loop component 106 so that its 8 jam settings will determine the 16 modulating frequencies from information supplied to 8 pins thereof from an octal D-type flip-flop 114, as outlined in the following table:

| Freq. sequenc no. | carrier modulating frequencies (KHz) | jam settings of counter 112 | | | | | | | |
|---|---|---|---|---|---|---|---|---|---|
| | | 1 | 2 | 3 | 4 | 5 | 6 | 7 | 8 |
| 1 | 100 | X | X | | | | | X | X |
| 2 | 108 | X | X | | X | | | X | X |
| 3 | 116 | X | X | | | | X | X | X |
| 4 | 124 | X | X | | X | X | X | X | |
| 5 | 132 | X | X | | | | | | X |
| 6 | 140 | X | X | | X | | | | X |
| 7 | 148 | X | X | | | X | | | X |
| 8 | 156 | X | X | | X | X | | | X |
| 9 | 164 | X | X | | | | X | | X |
| 10 | 172 | X | X | | X | | | | X |
| 11 | 180 | X | X | | | X | X | | X |
| 12 | 188 | X | X | | X | X | X | | X |
| 13 | 196 | X | X | | | | | | X |
| 14 | 204 | X | X | | X | | | X | X |
| 15 | 212 | X | X | | | X | | X | X |
| 16 | 220 | X | X | | X | X | | X | X |

The flip-flop 114 as diagrammed in FIG. 5 acts as a latching device so that during an increase in magnitude of signals applied to its input 116 from the program controller 36 during modulation intervals, latching occurs with respect to the information transferred to counter 112 from the program controller 36 through its data bus 118. The bus signals will therefore have no affect on the jam settings of counter 112 except during latching operations of 0.6 μs duration at 17 μs intervals established by the input signals in line 116 to the flip-flop 114 from the program controller 36 thereby enabling performance of the 16 modulating frequency sequence action of the modulator 22.

As hereinbefore described with respect to FIG. 5, the signal in line 100 to the input of NAND date 94 and the Q output of flip-flop 102 in line 101 are respectively connected to the flip-flop 156 of gating control 26 to which a 2.048 MHz clock signal is applied through line 120 from the crystal controlled clock 24. The clock signal in line 120 is divided by two dual D-type flip-flops 122 and 124 in the gating control 26 as shown in FIG. 5 to produce a 1024 KHz signal at the Q output of flip-flop 122 interconnected with the clock input of flip-flop 124, and a 512 KHz signal at the Q output of flip-flop 124. The clock signal so divided at the Q output of flip-flop 124 is applied by line 126 to the inputs of two synchronous, 4-bit binary counters 128 and 130 to divide such signal into output waveform signals in lines 138, 140 and 142. The signals in lines 138 and 142 are applied to the clock input and D input, respectively, of a dual D-type flip-flop 144 from which a 2 KHz displaced square wave signal is obtained at its Q output. Such signal in line 148 from the Q output of the flip-flop 144 as well as the signal from counter 130 in line 140 are applied to the reply timing control 28, to which line 146 from loop circuit 106 of the modulator 22 is connected through inverters 181 and 183. The Q output of flip-flop 144 in line 148 is also applied to one input of AND gate 150, the other input of which receives a signal through line 154 from the reply timing control 28. The output control signal of AND gate 150 is applied to the D input of flip-flop 156 aforementioned, to which a modulator output signal is applied through line 101 to its clock input. The gating control signal is thus produced at the Q output of flip-flop 156 in the gating control 26 and is applied through the input line 100 to the NAND gate 94 of the transmitter circuit 20, as hereinbefore referred to.

Figure 6:
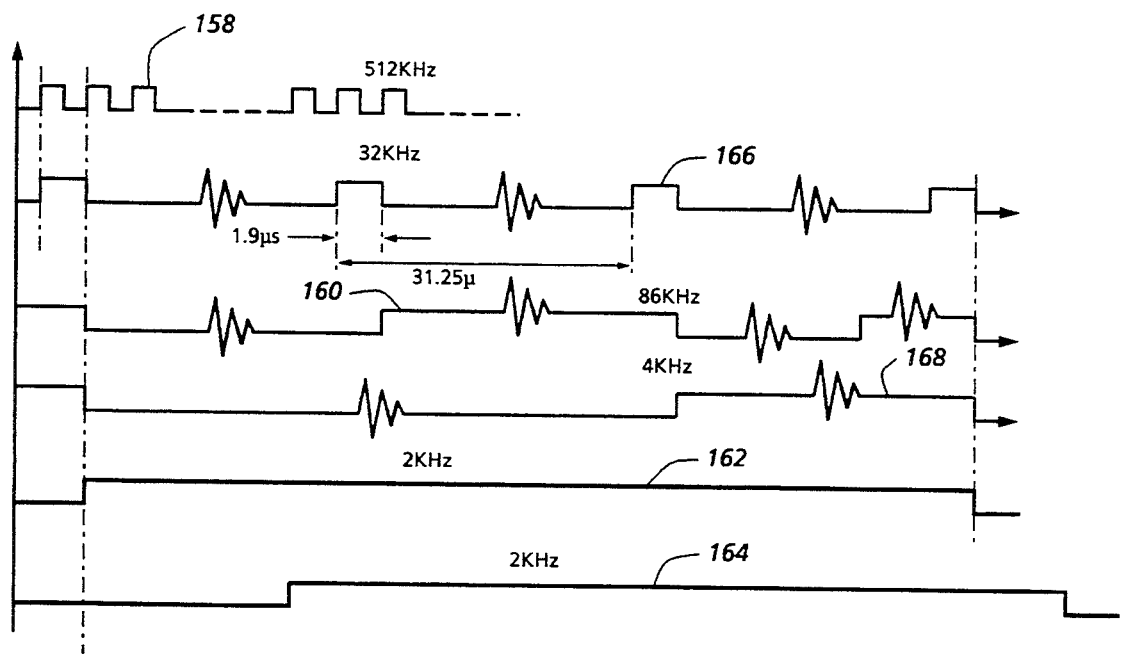
FIG. 6 is a waveform diagram associated with the gating control component of the circuitry diagrammed in FIG. 5.

The various waveforms hereinbefore referred to in connection with the gating control 26 diagrammed in FIG. 5, are depicted in FIG. 6. The divided clock signal 158 of 512 KHz signal emitted from the Q output of flip-flop 124 applied through line 126 to the counters 128 and 130, results in the output of signals from counter 130 in lines 138 and 142 respectively. Such signals 160 and 162 as depicted in FIG. 6 are of 8 KHz and 2 KHz frequency, respectively, and produce a displaced square wave signal 164 of 2 KHz in line 148 from the the Q output of flip-flop 144. The 32 KHz signal 166 shown in FIG. 6 is obtained from the clock signal 158 divided by counter 128 and applied to counter 130, while signal 168 is the output of counter 130 applied to the reply timing control 28.

Referring once again to FIG. 5, the reply timing control 28 includes a Quad D-type flip-flop 170 having a clock input, connected to the program controller 36 by line 172 and to two other bus inputs therefrom. The three inputs from the program controller 36 are coordinated to produce two outputs from flip-flop 170 in lines 174 and 176. The output in line 174 is applied as a clock signal to the J input of a dual J-K type flip-flop 178 interfaced with loop circuit 106 through resistor 179 in series with the inverters 181 and 183. The flip-flop 178 has a clock input to which the 2 KHz displaced square wave signal 164 from the gating control 26 in line 148 is applied. The Q output of flip-flop 178 is connected to its K input and to the AND gate 150 in the gating control 26 as aforementioned through line 154 to define the carrier modulation intervals. The output of flip-flop 170 of the reply timing control in line 176, is applied to one input of NAND gate 180, the other input of which receives the aforementioned signal 168 from the gating control 26 in line 140.

Figure 7:
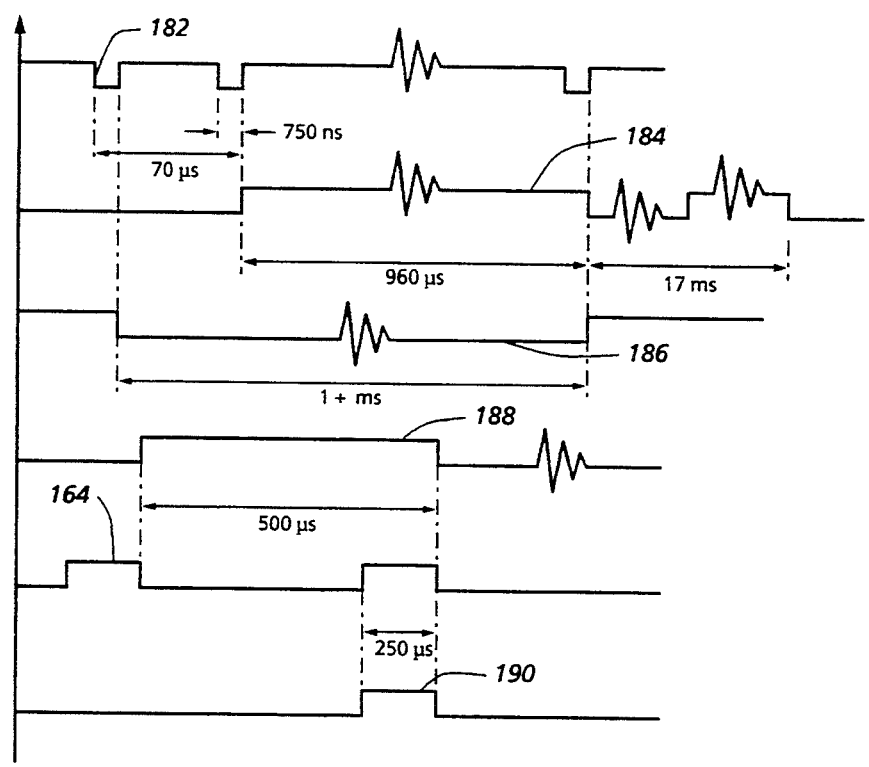
FIG. 7 is a waveform diagram associated with the reply timing control associated wtih the circuitry diagrammed in FIG. 5.

Referring now to FIG. 7, various signal waveforms associated with the reply timing control 28 hereinbefore described are graphically depicted. The negative going pulses 182 of the clock signal in line 172 from the controller 36 have a pulse duration of 750 ns and are time spaced by 70 µs as shown. Such clock signal pulses 182 produce the waveform signals 184 and 186 as shown, at the outputs of flip-flop 170. Clock signals 164 in line 148 from the gating control 26 depicted in FIG. 6 together with output signal 184 in line 174 applied to the J input of flip-flop 178 produces the Q output 188 shown in FIG. 7, only between pulses of the 2 KHz clock signal 164. Such Q output signal 188 is applied to the K input of flip-flop 178 so that the J and K inputs are transferred alternately in order to establish the 500 µs high for the signal 188 at the proper interval as shown.

Figure 8:
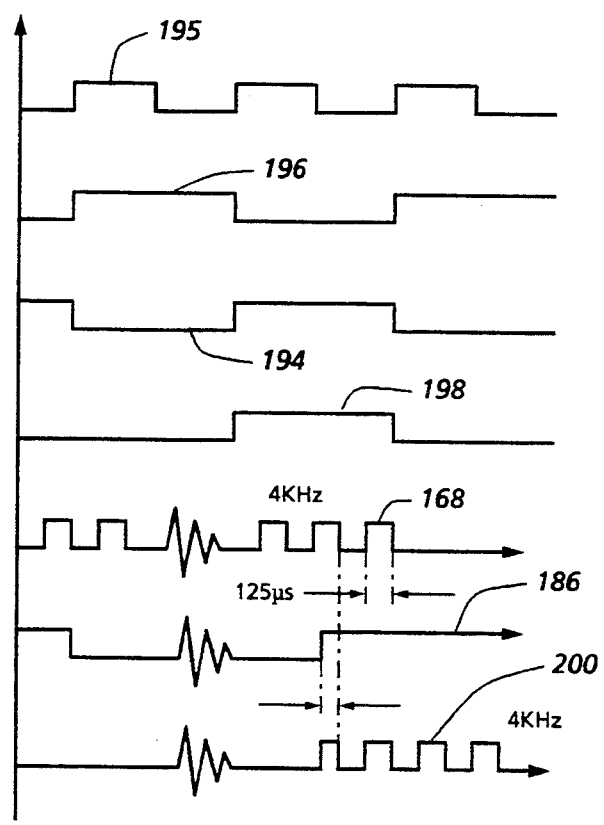
FIG. 8 is a signal timing diagram associated with the circuitry diagrammed in FIG. 5.

The pulses of signals 164 and 188 as depicted in FIG. 7, are applied through lines 148 and 154, respectively, to the NAND gate 150 shown in FIG. 5 to produce an output signal 190 applied through line 192 to flip-flop 156, as diagrammed in FIG. 7, in order to define the carrier modulation interval. The aforementioned clock signal in line 104 applied to flip-flop 102 of the modulator 22, is denoted in FIG. 8 as 195. The signal 195 is inverted and divided to obtain a signal waveform 194 at the Q output of flip-flop 102 as also depicted in FIG. 8, corresponding to the modulation intervals 72 depicted in FIG. 4. The waveform 196 of the inverted signal at the Q output of flip-flop 102, as depicted in FIG. 8, is applied to its D input of flip-flop 102 and through line 101 is applied to the flip-flop 156 of the gating control 26. The output signal 190 of NAND gate 150 in line 192, when applied to the D input of flip-flop 156 will accordingly produce a gating signal 198, as shown in FIG. 8, applied through line 100 to one input of AND gate 94 of the modulator 20 as shown in FIG. 5. The output waveform of the signal in line 92 from gate 94 therefore determines the carrier modulation frequency and interval for a designated credential group and corresponds to the aforementioned gating signal 198.

The reply time slots $S_1$–$S_{64}$ as diagrammed in FIG. 4, are set by the action of NAND gate 180, hereinbefore referred to, under control of the clock waveform signal 168 depicted in FIG. 8, applied through line 140 from gating control 26, and the periodic waveform signal 186 applied through line 176 to shut off the time slots during carrier modulation. As depicted in FIG. 8, the timing relationship of signals 168 and 186 to the output timing reference signal 200 in line 202 from NAND gate 180, as depicted in FIG. 5, controls reception by receiver 30.

Figure 9A:
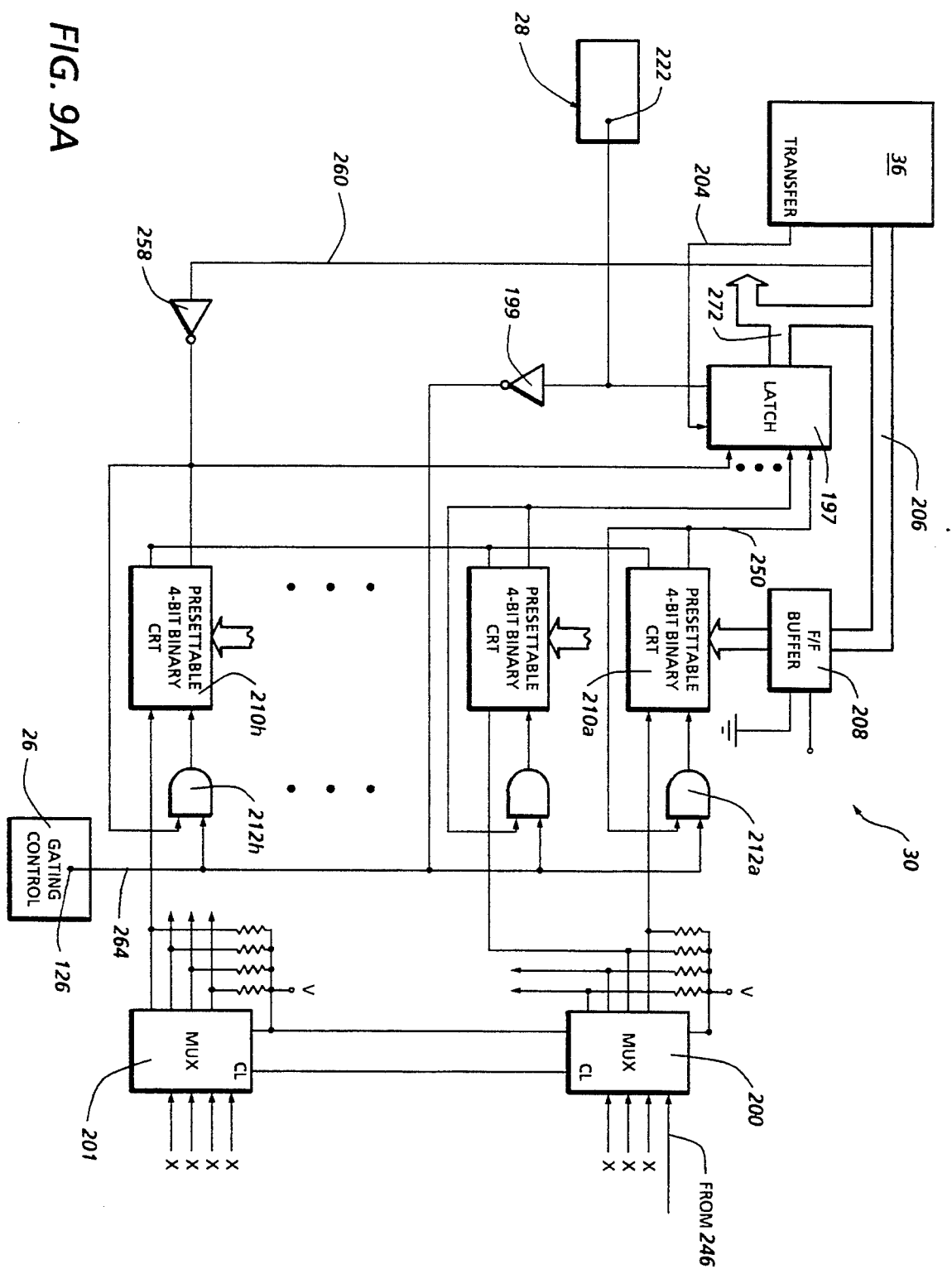
FIGS. 9A and 9B are more detailed circuit diagrams associated with portions of the tracker unit depicted in FIG. 1, other than those portions depicted in FIG. 5.

The timing reference signal 200 in line 202 from the reply timing control 28 is applied to the clock input of an octal D-type latch 197 of the receiver 30 and through inverter 199 to multiplexers 212 as shown in FIG. 9A. A transfer pulse from programmer 36 is also applied to latch 197 through line 272. The latch 197 is under control of signals in bus 206 extending between programmer 36 and an octal D-type flip-flop 208 acting as a buffer to limit operation of 8 presettable, 4-bit binary up/down counters 210(a) to 210(h) with which NAND gates 212(a) to 212(h) are respectively associated as shown in FIG. 9A. The multiplexer 201 receiving input signals in four channels from the frequency channel divider 32 (shown in detail in FIG. 9B), is connected to the inputs of four of the counters 210 (a), (b), (c) and (d) to which the outputs of four of the NAND gates 212(a-d) are applied. Similarly, the multiplexers 212 receiving input signals from four other channels, are connected to the inputs of the four other counters 210(e-h) to which the four other NAND gates 212(e-h) are connected as diagrammed in FIG. 9A.

Figure 9B:
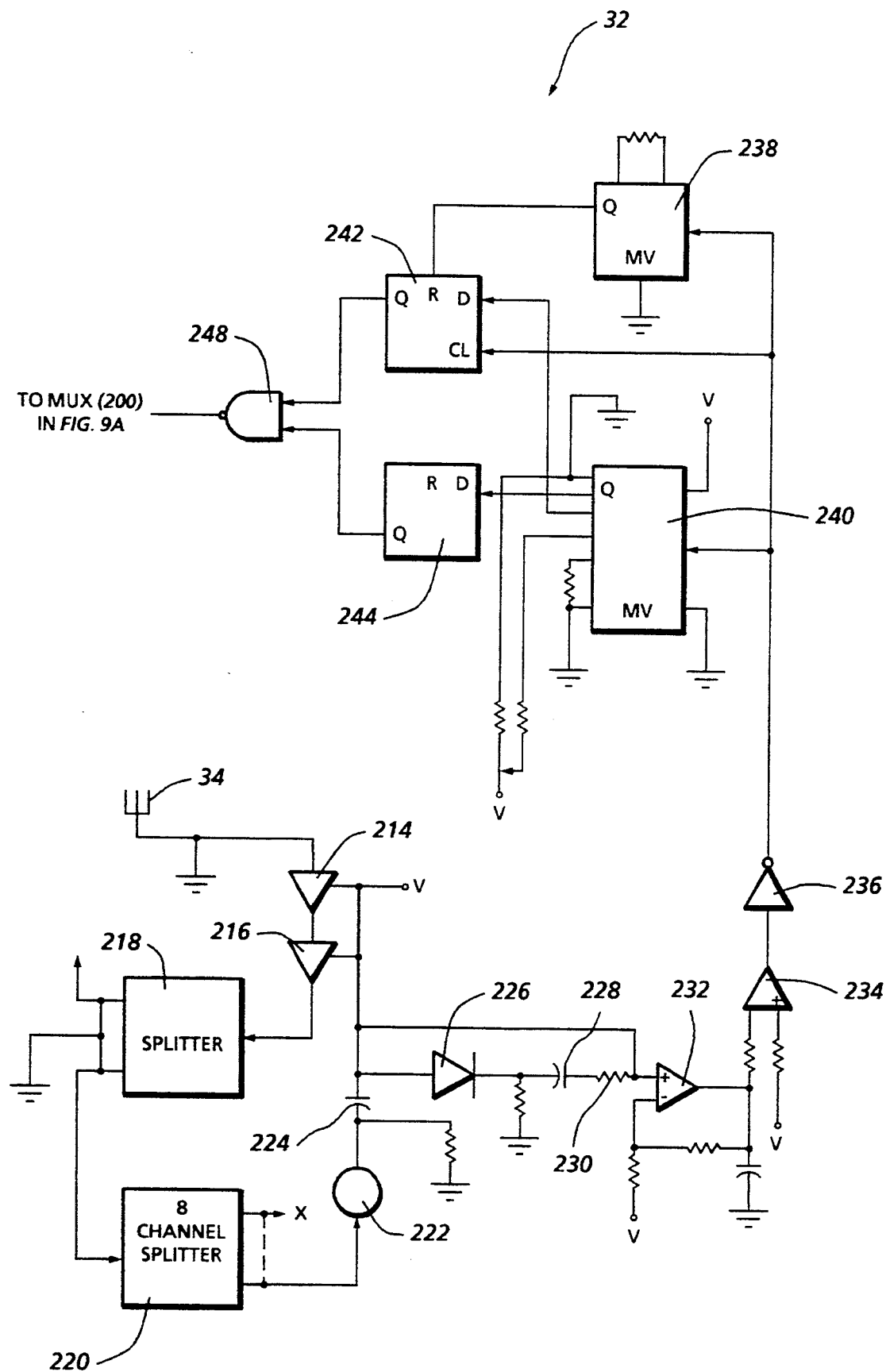

The frequency channel divider 32 also shown in FIG. 9B, includes a pair of series connected low-distortion wide band amplifiers 214 and 216 coupling the receiver antenna 34 to an RF 2-way splitter 218 interconnected with a 4-way RF splitter 220 to which 8 different and simultaneously operating signal channels are connected. Each channel (one of which is shown) includes a SAW filter 222 coupled by a capacitor 224 to a Schottky diode 226 connected in series with capacitor 228 and resistor 230 to an operational amplifier 232. The output of amplifier 232 is coupled to a comparator 234. The output of comparator 234 is coupled by Schmitt trigger 236 to a pair of multivibrators 238 and 240. The multivibrator 238, which is of a CMOS monostable/actable type, has its Q output connected to the reset terminal of a dual D-type flip-flop 242 clocked by the signal output of Schmitt trigger 236. The output of multivibrator 240, which is of the dual monostable type, is applied to the D input of a flip-flop 244. The Q output of flip-flops 242 and 244 are applied to the inputs of a NAND gate 246 from which a divided channel signal is fed to one of the eight channels at the inputs of the multiplexers 200 and 201 of the receiver circuit 30 depicted in FIG. 9A.

In response to a credential reply signal picked up by antenna 34 of the tracker unit, a drop in signal voltage occurs at the output of one of the SAW filters 222 which appears at the output of NAND gate 246 connected to a corresponding channel inputs of one of the multiplexers 200 and 201 in the receiver circuit 30 during divided channel operation. When the strobe clock signal voltage from the reply timing control 28, applied by inverter 199 to one of the inputs of the multiplexers 200 and 201 falls, the SAW filter output signal is switched to one of the counter enable output lines 248 for transfer through output line 250 of the counter 210 to one input of a corresponding one of the counter enabling NAND gates 212. The aforementioned enable signals in lines 248 and 250 remain high until a pulse is applied to the counters 210 through inverter 258 and line 260 from a programmer data bus 206. In response to the latter pulse, the counters 210 will count 37 periods of an input clock signal in line 262 derived from the output of corresponding NAND gates 212 when a 512 KHz waveform signal 158 is applied to the NAND gate from line 126 of the gating control 26 associated with the transmitter 20 as hereinbefore described.

Figure 10:
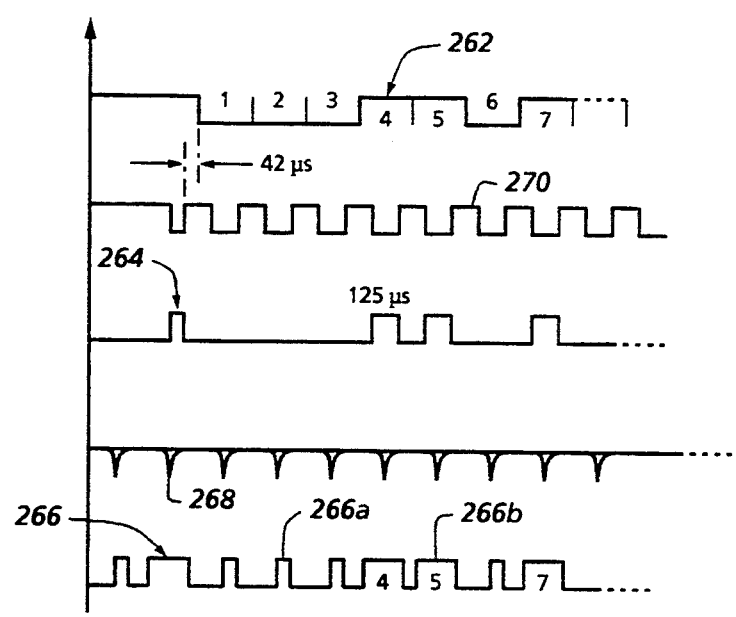
FIG. 10 is a waveform diagram associated with the receiver circuit diagrammed in FIG. 9A.

The waveform signals referred to in connection with the latter divided signal channel operation of the receiver circuit 30, are depicted in FIG. 10. Reference numeral 262 refers to a typical input signal waveform from the output of NAND gate 246 for one of the divided signal channels of frequency channel divider 32. The signal waveform 262 in the example shown includes low portions covering time slots $S_1$, $S_2$, $S_3$ and $S_6$ of the 64 time slots during which reply signals are received. During such low portions of the signal 262, low portions of an enable signal 264 produced in a corresponding output line 248 of multiplexer 200 or 201 are aligned with those of signal 262 during which reply signals are received. The enable signal 264 results in the signal pulses 266 in the output line 250 of a corresponding counter 210 having positive pulses which occur in response to count initiating pulses 268 applied to the counters as a clock input from the data bus 206 through inverter 258. The counting of periods of 72 µs duration occurs when a reply signal is being received during the time slots $S_1$, $S_2$, $S_3$ and $S_6$ for example, while the counting of longer duration pulses 266(b) of 197 μs duration occurs during the time slots $S_4$, $S_5$ and $S_7$ when there are no reply signals.

The input signals 262 to the receiver 30 are clocked by an inverted strobe signal 270 having pulses of 125 μs duration as shown in FIG. 10 with a 42 μs offset delay. The pulse signal 262 applied to the multiplexers 200 and 201 through inverter 199 as aforementioned are derived from the strobe signal pulses of the timing reference signal 158 in line 202 of the reply timing control 28.

The signal pulses 266 from counters 210 applied to the inputs of latch 197 of the receiver 30 through lines 250 as shown in FIG. 9A, are retained therein when the strobe transfer signal from the programmer 36 in line 204 falls. The signal pulses 266 are transferred by latch 197 when a very short duration transfer signal spike is received 35 μs later, such transfer signal spikes being similar to those of signal 268. Corresponding pulse outputs from latch 197 are applied through output bus 272 to the signal data processor 38, when a reply signal is not received.

In accordance with one embodiment of the invention, the credential units 16 may be constructed from a rectangular multi-laminate arrangement illustrated in greater detail in FIG. 11. The antenna elements 44 and 46 depicted in FIG. 3, are mounted on an antenna board 270 peripherally soldered to one side of the flange 272 of a three-sided copper foil frame section 274 acting as a ground plane connector. Dielectric foam spacers 276 and 278 are glued to the other side of the frame section flange 272 and to one side of a battery case 280 enclosing a power supply such as a lithium battery exposing the positive and negative terminals 282 and 284 thereof for contact with components of the unit 16 mounted on the confronting side of the antenna board 270. The battery case 280 is also peripherally spaced by a foam spacer 286, to which it is glued, from the confronting side of a data processing inboard 288 on which the other components of the unit 16 are mounted. The foam spacer 286 is glued to one side of the flange 290 of another ground plane connector frame section 292, overlapping and soldered to the first mentioned frame section 274. The other side of copper flange 290 is soldered to the data processing board 288 to complete the assembly of the unit 16. The open sides of frame sections 274 and 292 expose the access opening 294 of the battery case 280 for insertion or removal of the lithium battery.

Summarizing the foregoing description, the transmitter 20 of the tracker unit 10 transmits an amplitude modulated microwave beam 12 to define a volume within which the identification process is performed. In accordance withone embodiment, a carrier signal of a 10.46 GHz frequency is modulated sequentially through frequency modulator 22 at each of 16 frequencies between 100 and 200 KHz. Following each modulation at one of the 16 modulation frequencies, a credential card unit 16 within the defined reception volume responds by transmitting at one of 8 reply frequencies between 200 and 300 MHz during one of 64 time slot intervals to complete the identification process in ¼ second with respect to an inventory of 8192 credential codes.

In addition to the transmitter 20 and modulator 22, the tracker 10 includes receiver 30 and controller 36 to respectively perform the inventory and reporting functions. The transmitter according to one embodiment has a coaxial-cavity transferred electron-effect oscillator, and a ferrite isolator to which the microwave antenna 18 is coupled, in the form of a conventional horn or a printed circuit, for the purpose of increasing angular dispersion so that at least two cycles of interrogation are accommodated when a credential wearer passes through the volume interrogated by the microwave beam 12.

A reply signal received from a credential unit 16 is amplified and split into eight paths by the frequency channel divider 32 as diagrammed in grater detail in FIG. 9B. Each path enters a Surface Acoustical Wave (SAW) filter having a 18.2 dB insertion loss, a −55 dB bandwidth of 4.3 MHz and a −3 dB bandwidth of 1.3 MHz. The centers of the 8 channel frequencies are between 300 MHz and 200 MHa. Each channel has a shielded detector formed by a resistor network and a Schottky Barrier diode 226. The detected output drives a high-impedance operational amplifier 232 followed by a comparator circuit. Thus the signal from the credential unit 16 is detected by the appropriate SAW filter and diode amplifier and results in a logic-level signal of duration and time-slot location identifying the transmitting credential unit.

The program controller 36 which includes a microprocessor, random access memory for data storage, read only memory for program storage and input/output devices, selects the required carrier modulation, monitors the outputs of receiver 30 and forms messages for transmittal to a main controller section accommodating up to eight units to display identification code numbers and indicate status in terms of credential units entering or leaving the detection volume.

Each credential unit 16 is set to be activated by only one of the 16 frequencies used to modulate the microwave (10.46 GHz) carrier from the tracker 10. When the correct frequency carrier signal is received, the credential unit waits for the end of its transmission and then begins to clock out time slot periods of 250 μu seconds. There are 64 time slot periods available, from which one may be selected and assigned to one specific credential unit. During that time period, the credential unit emits one of eight assigned frequencies.

The 10.46 MHz carrier signal of the tracker search beam 12 is continuously emitted for modulation only during a 250 μu second interval imposed thereon at a specified frequency. At the end of the modulation period, a credential unit 16 having the corresponding detection frequency will output during one of its 64 time slot intervals, measured against a credential clock 62 and a clock 24 in the tracker, so that the error in starting the time count does not exceed more than one or two counts of either clock plus the error in locating the fall of the modulation period. By having the error occur at only the beginning of the first time slot in both the credential and the tracker units, accumulative error will be prevented. Thus a credential unit that transmits the 64th time slot will not miss the center of the tracker receiver time window 84 by more than the mismatch in measuring the signal fall as depicted in the timing diagram of FIG. 4.

The output from the tracker transmitter 20 occurs at approximately 17 millisecond intervals to which a credential unit is designed to respond during the time slot following a 250 μs time period 82 at the beginning of each response as depicted in FIG. 4. The receiver 30 is timed to receive during a window 84 of 125 μs duration in each available time slot period. This window is centered on the time slot thus providing an approximately 75 µs guard band about each window. In as much as the tracker has 8 receiving channels, 8 credential units may respond during a receive window 84 if that many credential units are in the tracker surveillance volume at that time. The tracker divider 32 separates the replies according to their frequencies so that the controller 36 can further identify the credential units.

The transmit and receive intervals are set up by the reply timing control circuit 28. All of the frequencies and waveforms are generated from a standard crystal oscillator and, therefore, are synchronized. The carrier modulation frequency is established when a pulse 72 as depicted in FIG. 4 is applied to the clock input and the credential unit will not begin to prepare the first reply time slot 82 until 270 µs after the fall of the carrier modulation signal 78. Since the first reliable receive window 84 does not coincide with a credential reply time slot until the next time slot, the first time slot 82 cannot be used. Using the carrier modulation signal 78 as the reference, the first receive window 84 will start 562.5 u seconds after its fall. Since 64 reply time slots are used, the minimum time until the carrier can be modulated again will be 16.562 milliseconds.

Figure 12A:
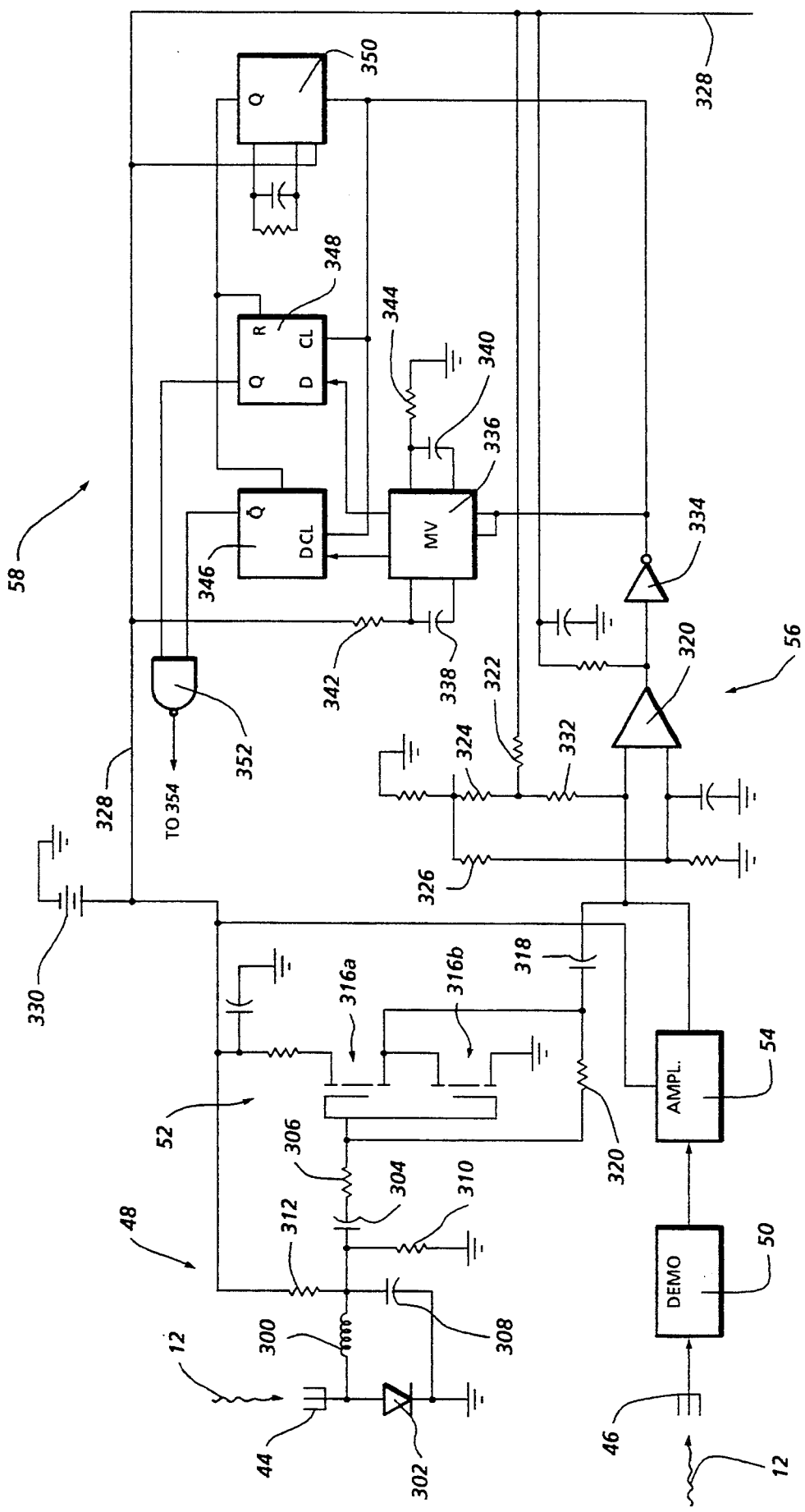
FIGS. 12A and 12B are more detailed circuit diagrams of the credential unit diagrammed in FIG. 3.

Referring now to a portion of the credential unit as diagrammed in FIG. 12A, a search beam 12 from the tracker 10 picked by the antennas 44 and 46 are demodulated by the demodulators 48 and 50 of similar circuit arrangement. Each demodulator is coupled by an inductor 300 to an antenna 44 or 46, which is coupled to ground through a diode 302. The modulated carrier signal is fed through inductor 300 to a filter network including in series therewith series connected capacitor 304 and resistor 306 together with grounded capacitor 308 and resistor 310 connected to the junction 314 between inductor 300 and capacitor 304 maintained at a predetermined voltage level through resistor 312.

The demodulated output signals emerging from the demodulators are fed from resistors 306 to the amplifiers 52 and 54, which are also of similar circuit arrangement. Each amplifier includes a CMOS Dual complementary pair of amplifier sections 316a and 316b having their output electrodes connected in parallel to the input of comparator 56 through capacitor 318, with feedback to the amplifier input electrodes through feedback resistor 320 for a gain of 40 sufficient to drive the credential unit processing circuits with the output of the antennas in the order of 3 MV or higher to a maximum of 200 MV. Signals outside of such range may accordingly cause false response of the credential unit.

The comparator 56 includes a dual BIMOS component 320 with its signal input connected to capacitor 318 and the other input connected to a reference voltage source established by series connected resistors 322, 324 and 326 connected to the power line 328 to which the unit battery 330 is connected. The signal input is maintained above a predetermined voltage level by resistor 332. The incoming signal amplitude is accordingly measured against a preset level above which the comparator transmits a square wave at its output having the frequency between 100 and 200 KHz of the incoming signal but a fixed amplitude. Such square wave output is inverted through inverter 334 and fed to the bandwidth enabler 58 to determine the frequency band of the demodulated signal.

The bandwidth enabler 58 as diagrammed in FIG. 12A includes a dual monostable multivibrator 336 having two trigger input terminals to which the inverted square wave output of the comparator is fed. The outputs of the multivibrator 336 adjustable by external capacitors 338 and 340 and resistors 342 and 344 and connected respectively to the power line 328 and ground, exhibit drops in voltage coincident with the rise in input signal voltage at low and high frequencies to reject the inverted square wave input from the comparator when its frequency is above or below a desired band for the credential unit. The outputs of the multivibrator 336 are respectively fed to the input terminals of a pair of dual D-type flip-flops 346 and 348 having Q and $\overline{Q}$ terminals at which relatively inverse output signals appear shaped by the square wave signal at their input terminals. The clock terminals of the flip-flops 346 and 348 are connected in common directly to the output of the comparator through inverter 334 while the reset terminals are connected in common to the Q terminal of a monostable multivibrator 350 to which the comparator is also connected, as shown in FIG. 12A, to control transfer of that portion of the signals fed to flip-flops 346 and 348 when the clock input rises, as will be referred to hereinafter in greater detail.

As a result of the foregoing arrangement in the bandwidth enabler 58, above band limiting action occurs when the demodulated antenna signal is at or above the upper frequency bandwidth limit characterized by a zero output at the Q terminal of flip-flop 346 and a dissimilar positive (+5 V) output at the Q terminal of flip-flop 348. If the demodulated antenna signal is within the frequency bandwidth, both $\overline{Q}$ and Q terminals of the flip-flops 346 and 348, respectively, will be similarly positive for within-band detection purposes. A below band limiting action also occurs in response to demodulated signals at or below the frequency band by the appearance of a zero output at the Q terminal of flip-flop 348 while a dissimilar positive output appears at the $\overline{Q}$ terminal of flip-flop 346.

Figure 12B:
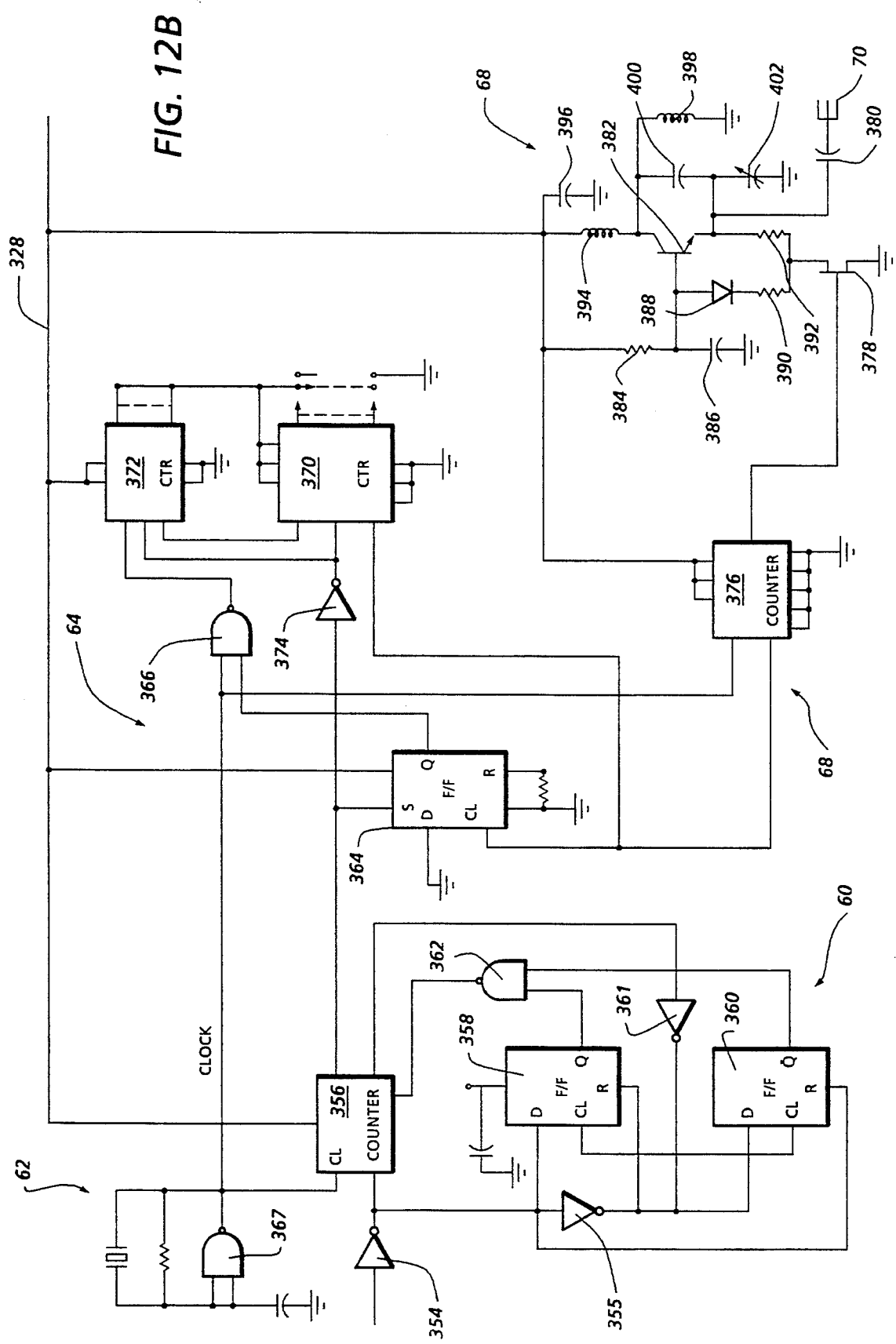

The outputs of the flip-flops 346 and 348 are fed to a NAND gate 352 of a Schmitt trigger type requiring similar waveforms at its two input terminals to function and thereby respond only to demodulated signals within the desired frequency bandwidth by providing a negative going output signal fed to the time slot synchronizing circuit 60 through inverter 354 as diagrammed in FIG. 12B. The length of time that the output of NAND gate 352 remains at zero is determined by the aforementioned multivibrator 350 of bandwidth enabler 58 by control over the reset signals applied to the flip-flops 346 and 348 thereof. The multivibrator 350 is triggered by a rise in the clock signal applied thereto from the comparator 56 to cause a drop in its reset output for a period of time equal to the duration of the triggering clock signal plus an additional interval of about 2 to 3 times the clock waveform duration. Thus the duration of the drop in reset signal level is normally 270 µs, slightly longer than the period of carrier signal modulation to accommodate transfer of data by the flip-flops 346 and 348 as hereinbefore described. The timing information associated with such data transfer is embodied in the signal output from NAND gate 352 fed by inverter 354 as diagrammed in FIG. 12B to the synchronizing circuit 60.

The inverted signal output of inverter 354 is applied to the input terminal of a presettable up/down counter 356 of synchronizing timer circuit 60, to the input D terminal of a flip-flop 358 and to its reset terminal through inverter 355, the output of inverter 355 also being applied to the resert terminal of a flip-flop 360, as shown in FIG. 12B, in order to synchronize time interval limits with the output of clock 62 connected to the clock terminal of counter 356. The output of flip-flops 358 and 360 at their Q and $\overline{Q}$ terminals, respectively, are fed to a Schmitt trigger NAND gate 362 to control therethrough operation of counter 356 in order to produce a timer setting output, fed to the activating circuit 64, thereby establishing a synchronous relationship between the demodulated antenna signal and both the rise and fall of the waveform output of clock 62.

The synchronized output pulse of counter 356, having a 270 μs duration for example, is fed to the set terminal of a dual D-type flip-flop 364 of the activating circuit 64. The pulse rise in such set signal applied to flip-flop 364 produces a similar rise in voltage, of 270 μs duration, at the Q terminal thereof. Such Q output of flip-flop 364 is applied to one input of Schmitt trigger NAND gate 366, which also receives the clock signal from the NAND gate 367 of clock 62. The oscillating output of NAND gate 366 is accordingly a square wave that falls in voltage synchronously with the voltage rise of 270 μs pulse duration, of the set signal to flip-flop 364. Such square wave output of NAND gate 366 continues at the 1.024 MH oscillation frequency of the clock signal until the output at the Q terminal of flip-flop 364 goes to zero.

A clock signal and the timer setting pulse of 270 μs duration from counter 356 is applied through inverter 374 to an 8-stage presettable divide-by counter 370. The jams on the counter 370 are set to divide the frequency of the clock signal to produce a first output pulse having a 250 μs duration equal to one clock cycle at the end of the 270 μs signal duration of the timer setting output of counter 356.

The output of NAND gate 366 is applied to counter 372 of the activating circuit 64 which is clocked through inverter 374 for selection of the time slot interval by virtue of the jam settings of counter 372. At the end of the set multiple (64) of the 250 μs time slot duration to which counter 372 is set, its output will fall and stay low until the next rise in the clock pulse applied thereto. While the time slot response is thereby defined by counter 372, the clock signal of clock 62 is applied to and enables a presettable up/down counter 376 connected to the clock terminals of flip-flop 364 and counter 370 to control oscillation thereof at a rate of 64 KHz so as to enable coding of the credential unit response to amplitude modulation from modulator 68.

One output of counter 376 is applied to the control electrode of grounded transistor 378 to enable the oscillator circuit of the reply signal generator 66, as diagrammed in FIG. 12B, to which transmit antenna 70 is coupled by capacitor 380, while another output of counter 376, connected to the clock terminal of counter 370, controls shut down of the 1.024 MHz clock signal fed to counter 370 through inverter 374. Thus, the filtering and timing actions of the circuits 60 and 64 are deactivated for intervals of 16 ms between signal modulation periods of modulator 68.

As shown in FIG. 12B, the modulator 68 includes a transistor 382 having a control base maintained at a predetermined voltage level through resistor 384 and connected to ground by capacitor 386 in parallel with series connected diode 388, resistor 390 and transistor 378 under control of counter 376 which also controls grounding of the emitter of transistor 380 through resistor 392. The collector of transistor 382 is connected to the oscillator circuit of reply signal generator 66 to which power is supplied from voltage line 328 through inductor 394 in parallel with grounded capacitor 396. A by-pass capacitor 398 is connected across the collector and emitter of transistor 400 while a grounded inductor 398 is connected to its collector. An oscillating output signal is accordingly obtained at the junction of the emitter of transistor 382 and capacitor 400, to which antenna 70 is coupled by capacitor 380. A variable grounded capacitor 402 is connected to the output emitter for adjustment purposes.

Figure 13:
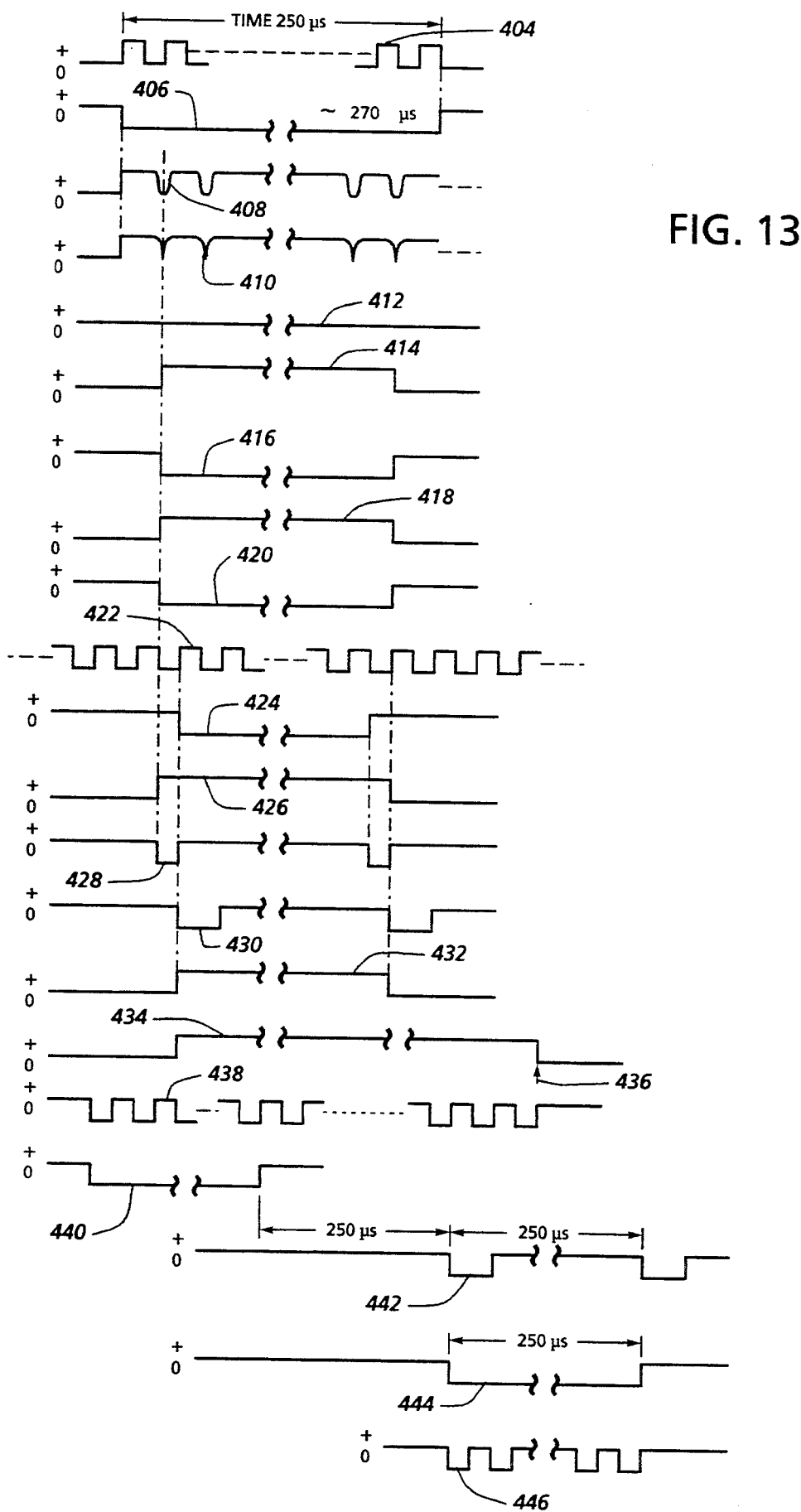
FIG. 13 is a waveform diagram associated with the circuitry depicted in FIGS. 12A and 12B.

The signal waveforms generated and transmitted by the circuitry hereinbefore described with respect to FIGS. 12A and 12B, are graphically depicted in FIG. 13. Square wave clock pulses 404 from amplifier 32, inverted by inverter 334, drive the flip-flops 346 and 348 and the multivibrators 336 and 350 during each 250 μs modulation period, as graphically shown. Such pulse signal 404 has the same frequency as the demodulated input signals received from the demodulators 48 and 50. The negative going reset signal 406, of approximately 270 μs duration, is thereby outputted from multivibrator 350 to reset the flip-flops 346 and 348 while pulse signals 408 and 410 are outputted from the multivibrator 336 to drive the flip-flops. The Q output 412 of flip-flop 346 applied to one input of NAND gate 352 will accordingly stay high with in band signal input while the Q output 414 of flip-flop 348 goes high with the first rise in signal 408 or 410. At the time, signal 416 from the output of NAND gate 352 goes low as shown. Such output of NAND gate 352 is inverted as signal 418 by inverter 354 and applied to counter 356 and drives flip-flop 358. Signal 418 is inverted again by inverter 355 to form signal 420 for reset of flip-flop 358 and to drive flip-flop 360, said flip-flops 358 and 360 being clocked by counter 356 through inverter 361.

The clock pulse output 422 of crystal controlled clock 62 is also graphically shown in FIG. 13, applied to counter 356. The Q output 424 of flip-flop 358 stays high until clock signal 422 returns to high after reset thereof while the Q output 426 of flip-flop 360 stays high until clock signal 422 goes low after reset thereof. The signals 424 and 426 are accordingly operative through NAND gate 362 to produce negative pulses 428 applied as clock enable to counter 356 which outputs negative pulses 430 inverted by inverter 361 to clock the flip-flops 358 and 360. The other output 432 of counter 356, synchronized with the modulation period, is applied to the set terminal of flip-flop 364 from which a Q output 434 is obtained applied to one input of NAND gate 366 to control clocking therethrough. The high of the Q output 434 goes low at the end a time slot at 436 as shown.

The inverted clock signal 438 from NAND gate 366 is applied to the counter 372 while the output 440 from counter 356, inverted by inverter 374, synchronizes both counters 370 and 372 as the output 442 of counter 372, set to divide by N+1, is applied to counter 370 to produce a clock signal 444 applied to flip-flop 364 and counter 356 in order to establish the first time slot and its shut off as hereinbefore described. The modulator control output 446 of counter 376, applied to the control electrode of transistor 378, is set to divide by 64 KHz.

Obviously, numerous modifications and variations of the present invention are possible in light of the above teachings. It is therefore to be understood that within the scope of the appended claims the invention may be practiced otherwise than as specifically described herein.

What is claimed is:

1. A method of operating a system for tracking credential units within a reception zone exposed to interrogating radiation emitted from a tracking location at a predetermined carrier frequency, said interrogating radiation being sequentially modulated at different modulation frequencies during periodic transmit intervals for detection by the credential units in the reception zone causing emissions therefrom of reply signals at different code frequencies during reception periods between said transmit intervals, said modulation frequencies of the detected interrogating radiation and the code frequencies of the emitted reply signals being determined by internal coding of the respective credential units; the improvement comprising the steps of: limiting said emissions of the reply signals at the reception zone to a plurality of time slots within said reception periods; selecting the time slots within which the reply signals are emitted in accordance with said internal coding of the respective credential units and timing reception of said reply signals within the selected time slots at the tracking location to identify the respective credential units being tracked thereat.

2. The improvement as defined in claim 1, including the further the steps of: dividing said reception of the reply signals at the tracking location into separate channels corresponding to the code frequencies thereof; and simultaneously processing the detected reply signals in the separate channels to extract code identification data with respect to the respective credential units in the reception zone from the modulation frequencies of the interrogating radiation and the code frequencies of the reply signals emitted in response to said detection of the interrogating radiation.

3. The improvement as defined in claim 2 including the further step of: limiting said detection of the reply signals to narrowed windows within the time slots to accommodate timing mismatch between establishment of the transmit intervals at the tracking location and the time slots at the credential units within the reception zone.

4. The improvement as defined in claim 3 including the further steps of: detecting termination of the transmit intervals at the tracking location; and programming establishment of the narrowed windows within the time slots relative to said detected termination of the transmit intervals to prevent error accumulation otherwise arising from the timing mismatch between said establishment of the transmit intervals and the time slots.

5. The improvement as defined in claim 4 including the further step of: monitoring changes in amplitude of the reply signals received at the tracking location; and programming said processing of the received reply signals in accordance with said monitored changes in amplitude thereof to extract status data with respect entry and departure of the credential units to and from the reception zone.

6. The improvement as defined in claim 2, including the further step of: monitoring changes in amplitude of the reply signals received at the tracking location; and programming said processing of the received reply signals in accordance with said monitored changes in amplitude thereof to extract status data with respect entry and departure of the credential units to and from the reception zone.

7. The improvement as defined in claim 1 including the further step of: limiting said detection of the reply signals to narrowed windows within the time slots to accommodate timing mismatch between establishment of the transmit intervals at the tracking location and the time slots at the credential units within the reception zone.

8. The improvement as defined in claim 7 including the further steps of: detecting termination of the transmit intervals at the tracking location; and programming establishment of the narrowed windows within the time slots relative to said detected termination of the transmit intervals to prevent error accumulation otherwise arising from the timing mismatch between said establishment of the transmit intervals and the time slots.

9. The improvement as defined in claim 1 including the further steps of: processing the reply signals received at the tracking location to extract code identification data with respect to the credential units in the reception zone; monitoring changes in amplitude of said received reply signals; and programming said processing of the received reply signals in accordance with said monitored changes in amplitude thereof to extract status data with respect entry and departure of the credential units to and from the reception zone.

10. In a system for tracking credential units within a reception zone exposed to interrogating radiation emitted from a tracking location at a predetermined carrier frequency, said interrogating radiation being sequentially modulated at different modulation frequencies during periodic transmit intervals for detection by the credential units in the reception zone causing emissions therefrom of reply signals at different code frequencies during reception periods between said transmit intervals, the improvement comprising: clock controlled means in each of the credential units for limiting said emissions of the reply signals therefrom at the reception zone to a plurality of time slots between successive transmit intervals, internal coding means in each of the credential units for selecting the time slots to which said emissions of the reply signals are limited and means for timing reception of said reply signals within the selected time slots at the tracking location to identify the respective credential units being tracked thereat.

11. The improvement as defined in claim 10, including frequency responsive means at the tracking location for dividing said reception of the reply signals within signal frequency channels in accordance with the different code frequencies thereof, and means for simultaneously processing the received reply signals within said frequency signal channels to extract credential code identification data from the respective code frequencies of the reply signals and from the modulation frequencies of the interrogating radiation emitted from the tracking location.

12. The improvement as defined in claim 11 including timing control means at the tracking location for limiting said reception of the reply signals to narrowed windows within the time slots established by the clock controlled means in the credential units to accommodate timing mismatch.

13. The improvement as defined in claim 12 including error control means for detecting termination of the transmit intervals at the tracking location and controller means connected to the timing control means and the error control means for programming establishment of said narrowed windows within the time slots relative to the detected termination of the transmit intervals to prevent error accumulation arising from said timing mismatch between the timing control means at the tracking location and the clock controlled means in the credential units.

14. The improvement as defined in claim 13 wherein said processing means includes means for monitoring changes in amplitude of the received reply signals to extract status data with respect to entry and departure of the credential units to and from the reception zone.

15. The improvement as defined in claim 10 including timing control means at the tracking location for limiting said reception of the reply signals to narrowed windows within the time slots established by the clock controlled means in the credential units to accommodate timing mismatch.

16. The improvement as defined in claim 15 including error control means for detecting termination of the transmit intervals at the tracking location and controller means connected to the timing control means and the error control means for programming establishment of said narrowed windows within the time slots relative to the detected termination of the transmit intervals to prevent error accumulation arising from said timing mismatch between the timing control means at the tracking location and the clock controlled means in the credential units.

17. The improvement as defined in claim 11 wherein said processing means includes means for monitoring changes in amplitude of the received reply signals to extract status data with respect to entry and departure of the credential units to and from the reception zone.

18. The system as defined in claim 10, wherein said credential units are identification cards.

19. In a method of identifying responders according to internal coding thereof while located within a reception zone exposed to interrogating radiation sequentially modulated during periodic transmit intervals at different frequencies corresponding to said internal coding for detection by the responders causing emissions therefrom of reply signals at different code frequencies; the steps of: limiting said emissions of the reply signals from the responders at the reception zone to a plurality of time slots within reception periods between said periodic transmit intervals; selecting the time slots for the respective responders within which the reply signals are emitted in accordance with the internal coding thereof and receiving the reply signals within the selected time slots at a tracking location from which the interrogating radiation is transmitted to identify and track the respective transponders thereat.

20. The method as defined in claim 19, wherein said responders are credential card units.

* * * * *